(12) United States Patent
Horst et al.

(10) Patent No.: US 7,757,419 B2
(45) Date of Patent: Jul. 20, 2010

(54) HOLDER FOR A CEILING SIGN

(75) Inventors: Markus Horst, Bad Oldesloe (DE); Stephan Röpke, Buxtehude (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/660,717

(22) PCT Filed: Sep. 14, 2005

(86) PCT No.: PCT/EP2005/009895
§ 371 (c)(1),
(2), (4) Date: Feb. 20, 2007

(87) PCT Pub. No.: WO2006/029846
PCT Pub. Date: Mar. 23, 2006

(65) Prior Publication Data
US 2008/0034630 A1    Feb. 14, 2008

Related U.S. Application Data

(60) Provisional application No. 60/610,274, filed on Sep. 16, 2004.

(30) Foreign Application Priority Data
Sep. 16, 2004    (DE) ........................ 10 2004 044 944

(51) Int. Cl.
*G09F 7/22* (2006.01)
(52) U.S. Cl. .................. 40/617; 40/606.01; 40/553; 248/317; 248/323
(58) Field of Classification Search .............. 40/553, 40/617, 570; 248/317, 342, 343
See application file for complete search history.

(56) References Cited

U.S. PATENT DOCUMENTS

| | | | | |
|---|---|---|---|---|
| 3,111,782 A * | 11/1963 | Quigley | ........................ | 40/617 |
| 3,126,575 A * | 3/1964 | Schoeneberg | ............... | 16/87 R |
| 4,089,129 A * | 5/1978 | Patterson, Jr. | ................ | 40/617 |
| 4,392,316 A * | 7/1983 | Thomas | ........................ | 40/617 |
| 4,520,984 A * | 6/1985 | Rouleau | ..................... | 248/489 |
| 4,646,997 A * | 3/1987 | Fadley | ......................... | 248/201 |
| 6,019,486 A | 2/2000 | Stewart | | |
| 6,416,027 B1 * | 7/2002 | Hart | ............................ | 248/324 |
| D515,143 S * | 2/2006 | Tigchelaar | ................... | D20/99 |

(Continued)

FOREIGN PATENT DOCUMENTS

CA    2080312 A1    4/1994

(Continued)

OTHER PUBLICATIONS

Office Action from Russian Application 2007106236/12 dated Apr. 30, 2010.

*Primary Examiner*—Lesley Morris
*Assistant Examiner*—Shin Kim
(74) *Attorney, Agent, or Firm*—Lerner, David, Littenberg, Krumholz & Mentlik, LLP

(57) ABSTRACT

A holding device for attaching a ceiling sign to a ceiling structure contains a base for attaching the ceiling elements and an adapter part for attaching the ceiling sign, the adapter part can be folded down from the base together with the ceiling sign in order to remove the ceiling elements.

16 Claims, 4 Drawing Sheets

U.S. PATENT DOCUMENTS

| | | |
|---|---|---|
| 7,261,269 B2 * | 8/2007 | Cote .......................... 248/317 |
| 2003/0024143 A1 * | 2/2003 | Mount ........................ 40/553 |
| 2008/0034630 A1 * | 2/2008 | Horst et al. ............. 40/606.01 |

FOREIGN PATENT DOCUMENTS

| | | |
|---|---|---|
| DE | 4037086 A1 | 6/1991 |
| DE | 195 01 972 A1 | 7/1996 |
| DE | 299 08 904 U1 | 8/1999 |
| DE | 696 23 384 T2 | 1/2003 |
| EP | 0 743 240 B1 | 11/1996 |
| RU | 32904 U1 | 9/2003 |
| WO | WO-03/074808 A1 | 9/2003 |

* cited by examiner

HOLDER FOR A CEILING SIGN

The present invention relates to a holding device, and particularly a holding device for attaching a sign to ceiling elements in aircraft.

The ceiling in aircraft generally comprises multiple ceiling elements, which are attached to a ceiling holder. In this case, a ceiling gap arises between the ceiling elements, in which a ceiling sign, such as an exit sign, is typically attached using clamps or something similar.

However, it is necessary to remove the ceiling elements at regular intervals for maintenance purposes. For this purpose, the sign must be taken off. In this case, the direct interface to the sign represents an obstruction when lowering and removing the ceiling elements.

Object of the present invention is to provide a holder which is decoupled from the ceiling, so that ceiling elements may be taken off easily without having to completely remove the ceiling sign.

The achievement of this object may be inferred from claim 1. Advantageous embodiments of the present invention are specified in the dependent claims.

The holding device according to the present invention for attaching a sign to a ceiling preferably contains a base, to which ceiling elements are attached, and an adapter part, which is foldably attached to the base in order to hold a ceiling sign.

According to a preferred exemplary embodiment of the present invention, the adapter part is folded down, or in other words folded away ("abklappen"), from the base using a hinge element, wherein a fixing element, such as a cotter pin or a screw or the like, fixing the adapter part on the base in the folded-up state, or in other words folded-to state ("anklappen").

In the folded-down state, the adapter part is held on the base only by the hinge element.

According to a embodiment of the present invention, an electrical terminal element is implemented between the end regions of the adapter part in order to electrically connect a ceiling sign attached to the adapter part to a power source.

According to another embodiment of the present invention, the terminal element is attached on its side facing toward the base to a cable connected to the power source, and is attachable to a ceiling sign on its side facing away from the base.

The holder according to the present invention receives four ceilings or ceiling elements simultaneously, for example. According to the present invention, a ceiling sign attached to the holding device is decoupled from the ceiling, so that the ceiling does not represent an electrical component and/or special part. For maintenance purposes, the holder is simply folded down together with the ceiling sign, through which simple ceiling mounting of the ceiling elements is possible, since when the holder is folded down, the ceiling elements may be pulled out of their anchoring. Complete dismounting of the holder and electrical terminals is therefore not necessary.

In the following, the present invention will be described in detail with reference to a preferred exemplary embodiment. In the figures, identical reference numbers identify identical or corresponding elements.

Figure 1:
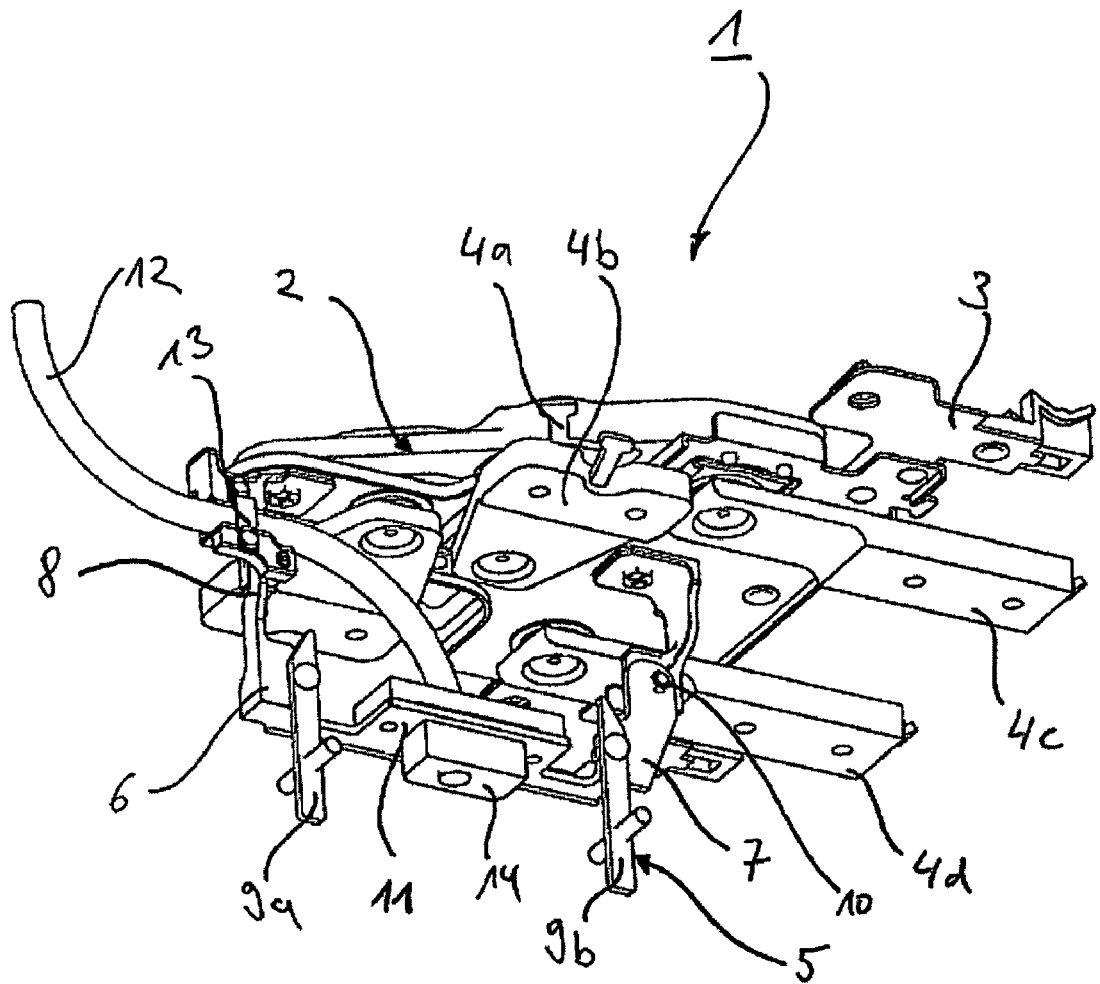
FIG. 1 shows a perspective view of a holding device according to a preferred exemplary embodiment of the present invention from below.

FIG. 1 shows a perspective view of a holder 1 according to the preferred exemplary embodiment from below. The holder 1 has a base 2, on which an attachment element 3 is implemented in order to attach the base 2 to a carrier structure (not shown) using rivets, screws, or the like, for example.

According to the preferred exemplary embodiment, holder elements 4a-4d, each of which receives and holds a ceiling element (not shown), are located on the bottom of the base 2 shown in FIG. 1.

An adapter part 5 projects downward essentially perpendicularly from the bottom of the base 2 shown in FIG. 1. The adapter part 5 has a first end region 6 and a second end region 7.

As shown in FIG. 1, the adapter part 5 is attached at its first end region to the bottom of the base 2 via a hinge 8. The attachment may be performed through riveting, welding, soldering, etc.

Through the hinge 8, the adapter part 5 may be folded down from the base 2 in such a way that the adapter part 5 is only held on the base 2 at the first end region 6 via the hinge 8. FIG. 1 shows the state in which the adapter part 5 is folded up onto the base 2 (onto the bottom of the base 2).

As shown in FIG. 1, the adapter part extends essentially in the longitudinal direction of the base 2 according to the preferred exemplary embodiment.

Two receiving elements 9a, 9b for receiving and holding a ceiling sign, for holding an exit sign, for example, project essentially perpendicularly downward at the two end regions 6, 7 of the adapter part 5. In FIG. 1, the holder according to the preferred exemplary embodiment is illustrated without a ceiling sign of this type.

According to the preferred exemplary embodiment shown in FIG. 1, the second end region 7 of the adapter part 5 is fixed on the bottom of the base 2 of the holder 1 using a cotter pin 10.

An electrical terminal element 11 is implemented between the end regions 6, 7 of the adapter part 5. The electrical terminal element 11 is connected to an electrical cable 12 on the side facing toward the bottom of the base 2. The other end of the electrical cable 12 is connected to a voltage supply source (not shown). According to the preferred exemplary embodiment, the electrical cable 12 is attached to the base 2 using a cable holder 13, such as a strap or clamp.

A plug connection 14 is provided on the side of the electrical terminal element 11 facing away from the base 2, in order to electrically connect a ceiling sign (not shown) to the voltage supply source via the terminal element 11.

Figure 2:
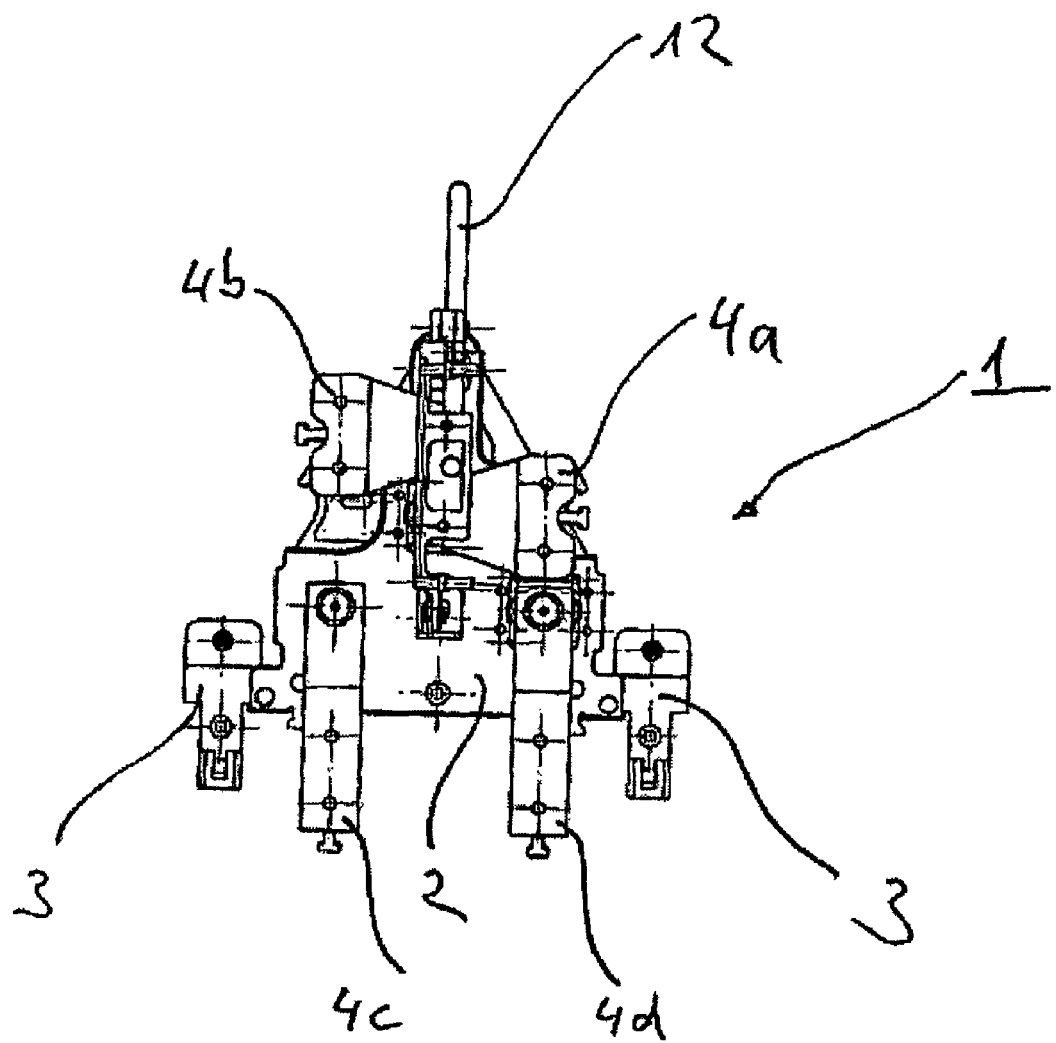
FIG. 2 shows a top view of the holding device according to FIG. 1.

FIG. 2 shows a top view of the holder 1 according to the exemplary embodiment shown in FIG. 1 from above.

As shown in FIG. 2, two holder elements 4c, 4d extend essentially parallel to one another in the longitudinal direction of the holder 1. Two holder elements 4a, 4b extend in the opposite direction to one another essentially in the transverse direction of the holder 1 and essentially perpendicularly to the holder elements 4c, 4d. As noted above, each of these holder elements 4a-4d is designed to receive and hold one ceiling element, for example.

As shown in FIG. 2, two attachment elements 3, via which the holder 1 may be attached to a carrier (not shown), extend essentially parallel to the holder elements 4c and 4d.

It is obvious that the alignment and/or orientations of the holder elements 4a-4d and/or of the attachment element 3 may be arbitrary, and must be adapted to a corresponding application. In addition, it is obvious that more or less than four ceiling elements may be attached to one or more holders as well.

Figure 3:
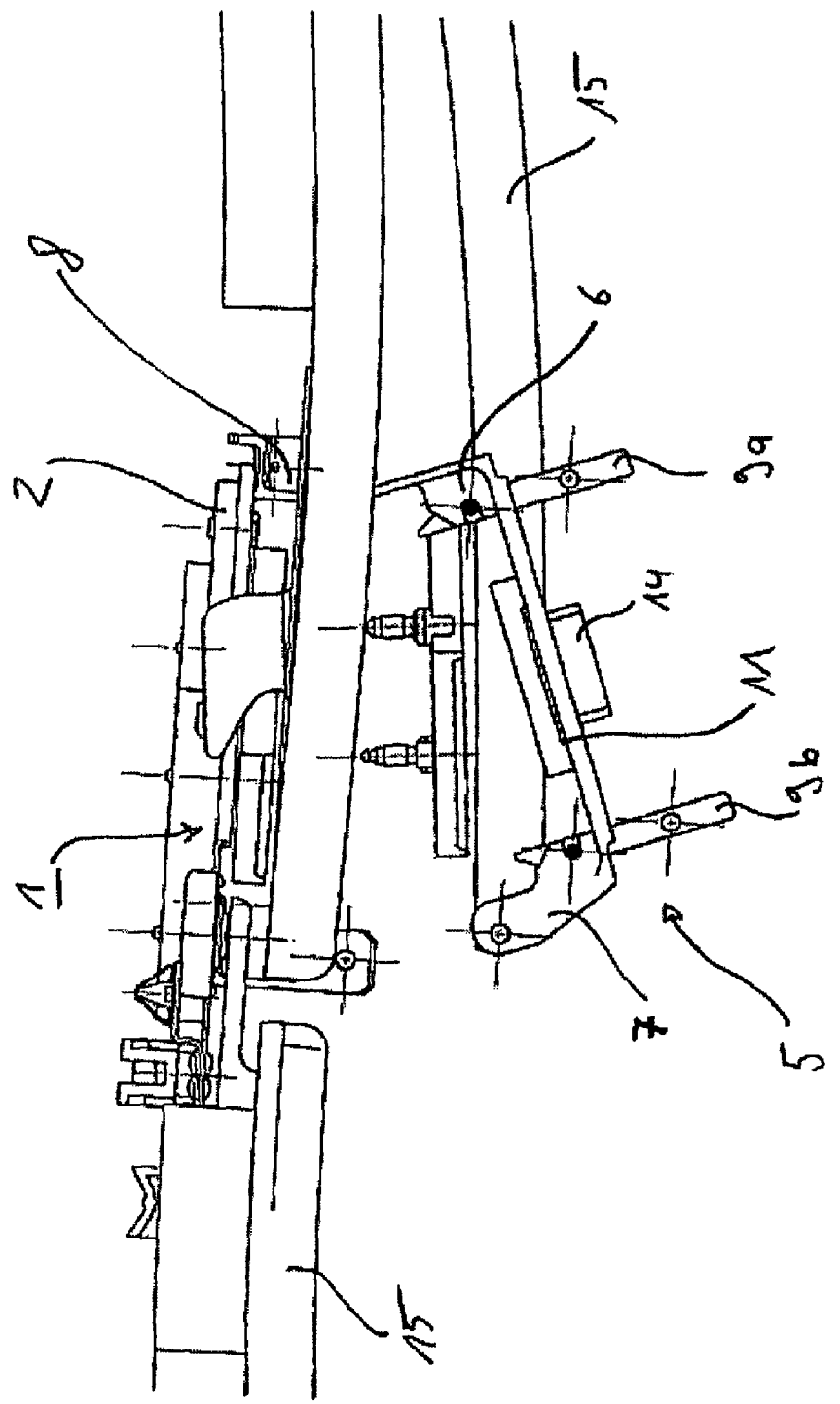
FIG. 3 shows a partial sectional view of a mounted holding device according to the preferred exemplary embodiment of the present invention.

FIG. 3 shows a partial cross-sectional view of a mounted holder 1 according to the preferred exemplary embodiment in a folded-down state.

In the folded-down state shown in FIG. 3, the adapter part 5 is only held on the base 2 at the first end region 6 of the adapter part 5 via the hinge 8. FIG. 3 also shows ceiling elements 15, wherein one of the ceiling elements 15 being able to be pulled downward and removed from a ceiling structure in the folded-down state of the adapter part 5 shown in FIG. 3, without having to dismount the holder 1.

Figure 4:
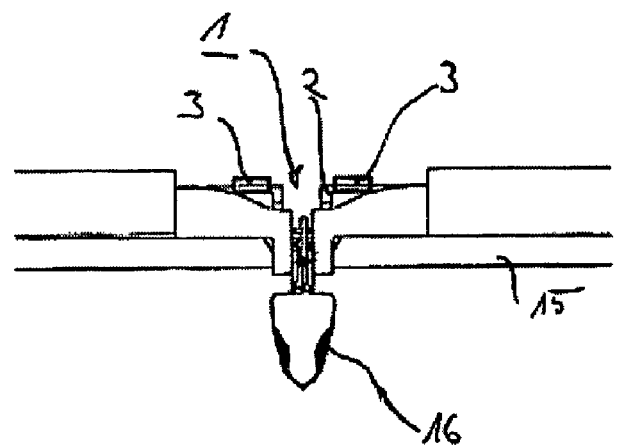
FIG. 4 shows a partial view of the mounted holding device according to the preferred exemplary embodiment, having a ceiling sign, from the rear.

FIG. 4 shows a partial view of the mounted holder 1 according to the preferred exemplary embodiment having a ceiling sign 16. In FIG. 4, for example, the ceiling sign 16 is an exit sign which is pushed onto the holder 1 according to the preferred exemplary embodiment and attached in a known manner. The ceiling sign 16 is especially pushed onto the receiving elements 9a, 9b of the adapter part 5, as shown in FIGS. 1-3, and attached in a typical way.

Figure 5:
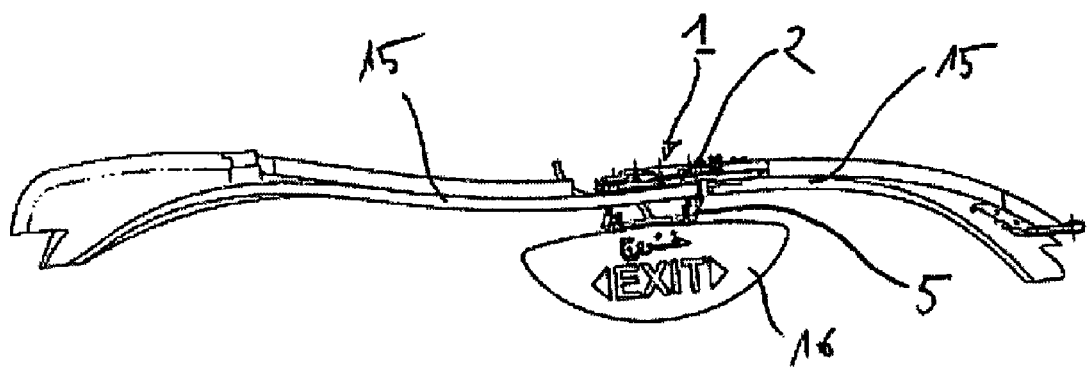
FIG. 5 shows a partial view of the mounted holding device according to the preferred exemplary embodiment, having the ceiling sign according to FIG. 4, from the side.

FIG. 5 shows the holder 1 according to the preferred exemplary embodiment having the ceiling sign according to FIG. 4 from the side. In FIG. 5, the holder 1 is also illustrated in a folded-up state. In a folded-down state, the adapter part 5 is folded downward together with exit sign 16. The ceiling elements 15 may thus be pulled downward and removed.

Although the present invention was described in detail above with reference to a preferred exemplary embodiment, it is obvious that the holder 1 according to the present invention may also be altered in order to be tailored to specific conditions and areas of application as long as a possibility is provided of being able to fold down a ceiling sign attached to the holder 1, in order to be able to remove the ceiling elements in the folded-down state, without dismounting the entire holder and the electrical terminals being necessary.

Furthermore, the preferred exemplary embodiment was described with reference to the ceiling structure of an aircraft. However, the holder according to the present invention may also be used for other areas of application which are based on the same object cited, for example, in buildings as well.

LIST OF REFERENCE NUMBERS 1 holder
2 base
3 attachment element
4a-4d holder elements
5 adapter part
6 first end region
7 second end region
8 hinge element
9a,b receiving elements
10 cotter pin
11 electrical terminal element
12 electrical cable
13 cable holder
14 plug connection
15 ceiling element
16 ceiling sign (exit sign)

The invention claimed is:

1. A holding device for attaching an information sign to a closed ceiling structure, wherein the ceiling structure comprises a multitude of directly adjacent ceiling elements, between which ceiling elements gaps are formed, the holding device comprising a base having holder elements located on a bottom of the base for receiving and holding a ceiling element each and an adapter part connected to the base for attaching the information sign, wherein the adapter part is down-foldable from the base together with the information sign sideways to the information sign, wherein the adapter part is held on the base at one end region by a hinge element and at its other end region by a fixing element, wherein the adapter part projects essentially perpendicular from the bottom of the base and extends through at least one gap formed between two of the ceiling elements, and wherein the information sign extends below the ceiling elements in all configurations of the holding device.

2. The holding device of claim 1, wherein the adapter part is only held on the base by the hinge element in a state folded down from the base.

3. The holding device of claim 1, wherein a receiving element for receiving the information sign projects essentially perpendicularly from the base at at least one end region of the adapter part.

4. The holding device of claim 1, wherein an electrical terminal element is implemented between the end regions of the adapter part in order to electrically connect the information sign attached to the adapter part to a power source.

5. The holding device of claim 4, wherein the terminal element has a first side facing toward the base and a second side facing away from the base, the first side being attached to a cable, which in turn is connected to the power source, and the second side being electrically connectable to the information sign.

6. An aircraft comprising a holding device for attaching an information sign to a closed ceiling structure, wherein the ceiling structure comprises a multitude of directly adjacent ceiling elements, between which ceiling elements gaps are formed, the holding device comprising:
   a base having holder elements located on a bottom of the base for receiving and holding a ceiling element each; and
   an adapter part connected to the base for attaching the information sign;
   wherein the adapter part is down-foldable from the base together with the information sign sideways to the information sign;
   wherein the adapter part is held on the base at one end region by a hinge element and at its other end region by a fixing element;
   wherein the adapter part projects essentially perpendicular from the bottom of the base and extends through at least one gap formed between two of the ceiling elements; and
   wherein the information sign extends below the ceiling elements in all configurations of the holding device.

7. The aircraft of claim 6, wherein the adapter part is only held on the base by the hinge element in a state folded down from the base.

8. The aircraft of claim 6, wherein a receiving element for receiving the information sign projects essentially perpendicularly from the base at at least one end region of the adapter part.

9. The aircraft of claim 6, wherein an electrical terminal element is implemented between the end regions of the adapter part in order to electrically connect the information sign attached to the adapter part to a power source.

10. The aircraft of claim 9, wherein the terminal element has a first side facing toward the base and a second side facing away from the base, the first side being attached to a cable, which in turn is connected to the power source, and the second side being electrically connectable to the information sign.

11. A holding device for attaching a component to a closed ceiling structure having two ceiling elements and a gap therebetween, the holding device comprising:
    a base; and
    an adapter part having two end regions and being pivotally connected to the base at one end region by a hinge element, the adapter part configured to be attached to the component;
    wherein the adapter part is connected to the base through the gap; and
    wherein the component extends below the ceiling elements in all configurations of the holding device.

12. The holding device of claim 11, wherein the adapter part is only held on the base by the hinge element in a state folded down from the base.

13. The holding device of claim 11, wherein a receiving element for receiving the component projects essentially perpendicularly from the base at at least one end region of the adapter part.

14. The holding device of claim 11, wherein an electrical terminal element is implemented between the end regions of the adapter part in order to electrically connect the component attached to the adapter part to a power source.

15. The holding device of claim 14, wherein the terminal element has a first side facing toward the base and a second side facing away from the base, the first side being attached to a cable, which in turn is connected to the power source, and the second side being electrically connectable to the component.

16. The holding device of claim 11, wherein the component is an information sign.

\* \* \* \* \*